UNITED STATES PATENT OFFICE.

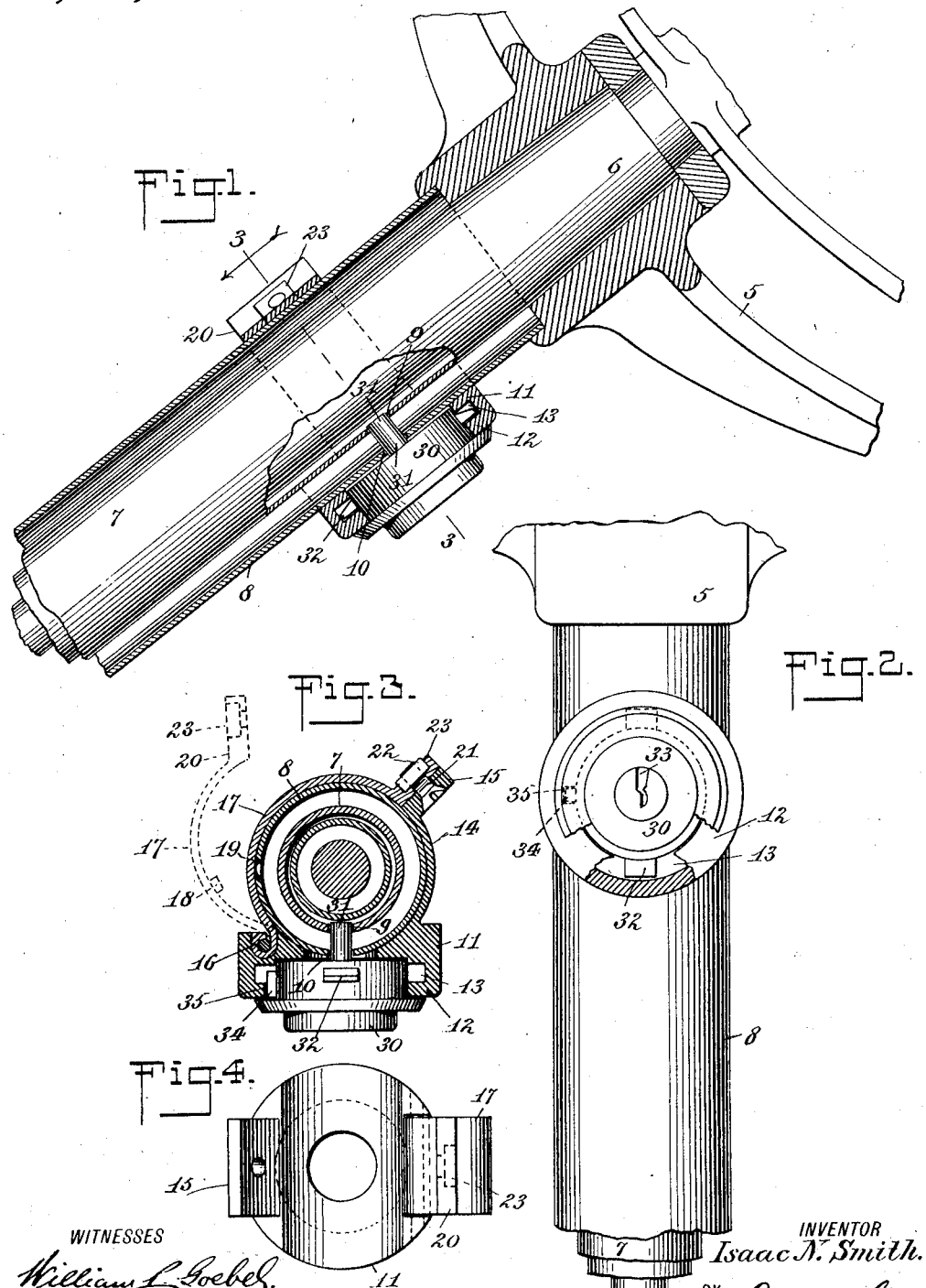

ISAAC NEWTON SMITH, OF NEWARK, NEW JERSEY.

LOCK FOR MOTOR-VEHICLE STEERING-GEARS.

1,332,075.  Specification of Letters Patent.  Patented Feb. 24, 1920.

Application filed September 16, 1919. Serial No. 324,078.

*To all whom it may concern:*

Be it known that I, ISAAC NEWTON SMITH, a citizen of the United States, and a resident of Newark, in the county of Essex and State of New Jersey, have invented a new and Improved Lock for Motor-Vehicle Steering-Gears, of which the following is a full, clear, and exact description.

This invention relates to new and useful improvements in locks, and it pertains more particularly to devices of this character especially adapted for locking the steering gears of motor vehicles.

The primary object of the invention is to provide means for attachment to the steering gear of a motor vehicle to render the same inoperative, and thereby prevent unauthorized operation of the motor vehicle.

A further object of the invention is to provide a device of this character which is capable of attachment to any type of motor vehicle steering gear.

A still further object of the invention is to provide a device of this character which when in its inoperative position is removable from the steering gear, thus obviating the disadvantages of having the lock carried by the steering gear when not in use.

With the above and other objects in view, reference is had to the accompanying drawings, in which—

Figure 1 is a fragmentary longitudinal sectional view of the upper portion of steering column;

Fig. 2 is a fragmentary rear elevation thereof;

Fig. 3 is a transverse sectional view taken on the line 3—3 of Fig. 1;

Fig. 4 is a detail plan view of the lock casing.

Referring more particularly to the drawings, the reference character 5 designates the steering wheel, and said steering wheel is secured to the upper tapered end 6 of a steering post 7 in the ordinary manner. This steering post 7 as commonly employed, consists of a tubular member, and it is so mounted as to revolve within a casing 8, which is immovably carried by the motor vehicle body.

In the present invention, the steering post 7 is provided with an opening 9, and the casing 8 is likewise provided with an opening 10, as shown in Figs. 1 and 3 of the drawings. The reference character 11 designates a lock casing, and said lock casing is provided with an annular flange 12, which is spaced from the bottom of the casing 11 to provide an annular channel 13. This lock casing 11 is provided with a rearwardly extending curved arm 14, upon the end of which is formed a perforated lug 15. Pivotally secured, as at 16, to the opposite side of the lock casing, is a strap 17, and said strap 17 is provided with a lug 18, which is adapted to engage in an opening 19 in the casing 8 to prevent rotary movement of the lock casing 11 about the casing 8 when said lock casing is positioned thereon. The free end of the strap 17 is formed with a perforated lug 20, and to secure the lock casing 11 in place on the casing 8, a bolt 21 is passed through the perforated lugs 15 and 20 of the straps 14 and 17, respectively. This bolt 21 is of the type commonly known as one-way, and it is provided on its threaded end with a nut 22, which seats in a recess 23 in the perforated lug 20. By this construction it will be apparent that neither the bolt 21 nor nut 22 may be removed without employing a specially designed tool for the purpose.

The reference character 30 designates a lock, and the same comprises a suitable barrel or cylinder, from the rear wall of which projects a rigid stem 31. The lock 30 is provided with latch members 32, which are adapted to lie within the channel 13 of the lock casing 11, and engage behind the annular flange 12 thereof to prevent withdrawal of the lock. These latch members 32 are operated by means of a suitable key inserted into a key-slot 33, said key serving to withdraw the latch members in order that the lock 30 may be removed.

In order to prevent a turning of the lock 30 when the key is inserted, said lock is provided with a lug 34, which lug engages in a recess 35 formed in one side of the annular flange 12. By the provision of this lug and recess 34 and 35, respectively, it will be seen that the lock is also guided in its insertion in the casing.

The operation of the device is as follows:

The steering post 7 and the casing 8 are provided with their respective openings 9 and 10, the opening 9 being alined with the opening 10, with the steering post in the position which it occupies when the steering wheels of the motor vehicle are so positioned as to cause the motor vehicle to travel in a true straight path. With the post 7 in the position relative to the casing 8 in which the openings 9 and 10 are in alinement, the lock 30 is inserted. The latch members 32 have also beveled edges which ride over the outer edge of the annular flange 12, the latches withdrawing into the lock 30 to permit of the insertion thereof. Upon the insertion of the lock 30, the rigid stem 31 enters the openings 9 and 10, and after this action has taken place, the latch members 32 engage behind the annular flange 12 to prevent withdrawal of the lock. By this construction, it will be seen that when the rigid stem 31 is engaged in the openings 9 and 10, movement of the steering post 7 relative to the casing 8 is prevented. Furthermore, by locking the motor vehicle with the wheels in the straight-way position, the motor vehicle may be manually moved short distances if this becomes necessary, yet, at the same time, means is provided for preventing a driving of the motor vehicle or the towing thereof by another vehicle.

I claim—

In combination with the steering column and a notched steering post, a lock member adapted for permanent attachment to said steering column, and provided with an open side defined by a marginal flange, a bodily removable lock element adapted to be received in the open side of said lock member, a rigid stem carried by said lock member, and adapted to engage the notch in the steering post to prevent relative movement of the steering post and steering column, and means carried by the removable lock member and adapted for engagement behind the annular flange of the permanent lock member to retain the rigid stem in engagement with the notch of said steering post, substantially as described.

ISAAC NEWTON SMITH.